United States Patent Office 3,471,775
Patented Oct. 7, 1969

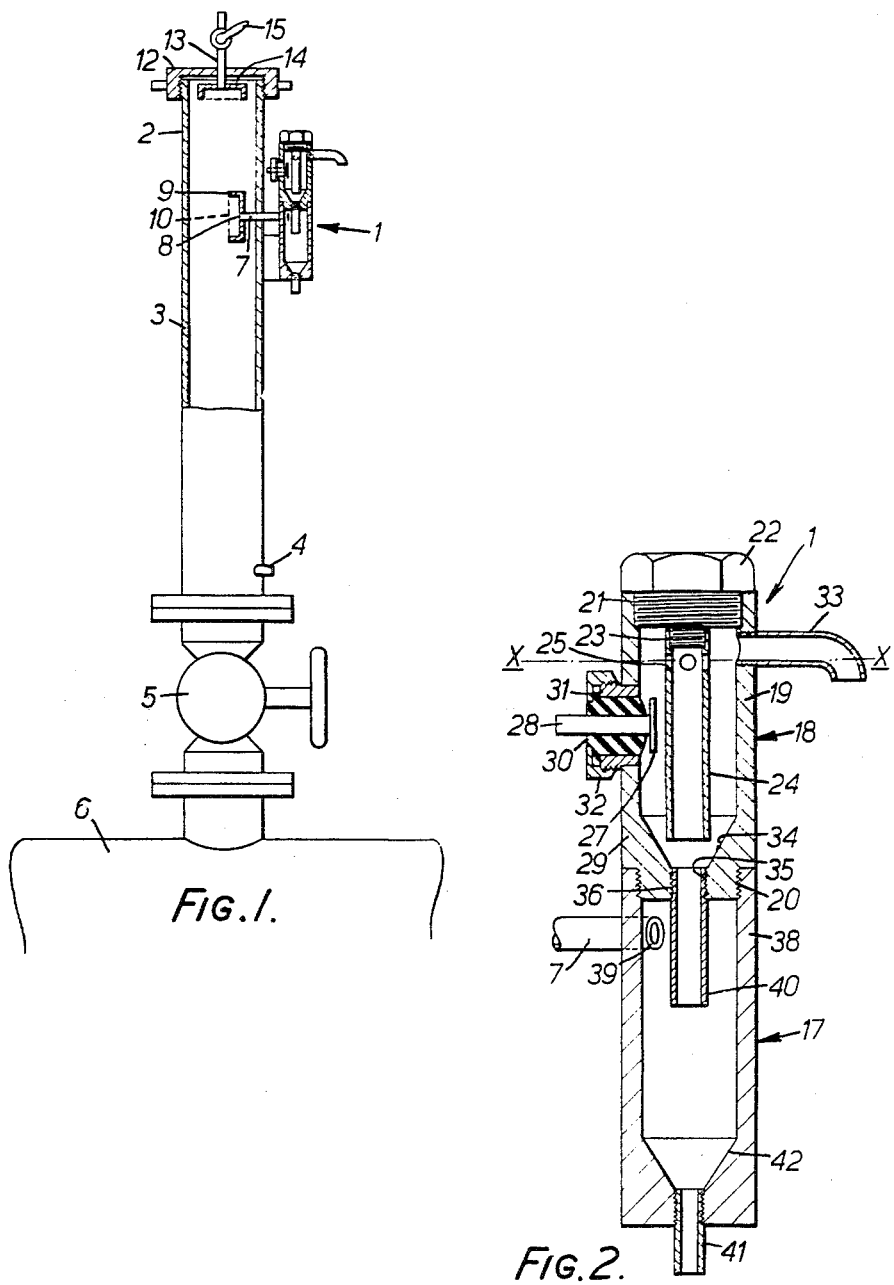

3,471,775
CONDUCTIVITY METER WITH CYCLONE FILTER
David Wildon Birnstingl, Brimscombe, Stroud, England, assignor to Mawdsley's Limited, Dursley, Gloucestershire, England
Filed Sept. 6, 1966, Ser. No. 577,267
Claims priority, application Great Britain, Sept. 14, 1965, 39,086/65
Int. Cl. G01r *11/44*
U.S. Cl. 324—30                                10 Claims

ABSTRACT OF THE DISCLOSURE

A measuring head for a conductivity meter comprising in combination an electrical conductivity cell with measuring electrodes, and a cyclone filter which forms a single unit with the conductivity cell. The filter has a hollow body having a vertically disposed longitudinal axis and defining an internal space and a side inlet which enters into the space in a direction such that liquid flowing from the inlet into the body is directed to one side of said longitudinal axis to provide vortical circulation of liquid in the body about said axis, a lower drain outlet for the egress of solid matter filtered from the liquid and a passage interconnecting the filter and the cell and acting as a vortex finder, filtered liquid passing from the filter to the cell through the passage prior to conductivity measurement in the latter.

---

This invention relates to measuring instruments, and in particular to concentration meters which are used to measure the volume concentration of solids entrained in a liquid. This is achieved by comparing the average electrical conductivity of the mixture with that of the solids-free liquid alone.

The conductivity of the solids-free liquid is detected in a reference cell to which a continuously changing sample of the liquid is supplied, the clean sample normally being obtained by filtering through a mesh-type filter. This arrangement has the disadvantage that the filter tends to clog in use, and the object of the invention is to provide an arrangement which provides a suitable sample, in the form of a continuous flow of solids-free liquid, which does not utilise mesh filters.

According to the invention a measuring head for a concentration meter comprises in combination a cyclone filter and an electrical conductivity cell which contains measuring electrodes and which forms a single unit with the cyclone filter.

Preferably the conductivity cell surmounts the cyclone filter. The upward flow of liquid from the cyclone filter after separation of entrained solids serves to displace existing liquid in the conductivity cell to the outlet thereof, whereby a continuously changing sample of solids-free liquid is supplied to the conductivity cell. Thus, the requirement for a concentration meter to detect instantaneously any change in the conductivity of the solids-free liquid is fully met in a simple manner.

The conductivity cell preferably comprises a hollow cylindrical body having a central tube the lower end of which is disposed above the point at which liquid enters the cell from the filter, and which has a vent aperture above the cell outlet level. Air bubbles in the liquid flowing from the filter to the cell are trapped in this tube, rise up the latter and escape through the vent aperture and hence from the cell. Conveniently, the tube is metallic and forms an earthed measuring electrode for the cell, a further measuring electrode, which is preferably adjustable, being disposed in the wall of the cell.

The measuring head may be mounted on a vertically disposed settling tube and in this case the liquid passes upwardly within the settling tube before entering the measuring head, so that any coarse particles in the liquid which are too dense to follow the upward stream of the liquid within the settling tube are trapped in the bottom thereof and do not enter the measuring head.

The liquid preferably leaves the settling tube somewhat below the top of the latter so that any air bubbles, or debris which has a tendency to float on the liquid, are trapped in the top of the settling tube above the outlet and does not enter the measuring head.

The invention will now be further described with reference to the accompanying drawings which show, by way of example, a concentration meter measuring head in accordance with the invention. In the drawings:

FIGURE 1 is an elevation, partly in section, showing the measuring head mounted on a settling tube, and FIGURE 2 is a sectional view on an enlarged scale showing the measuring head only.

Referring to FIGURE 1, the measuring head 1 is mounted somewhat below the top 2 of a vertically disposed settling tube 3 the lower end of which incorporates a drain plug 4 and is connected, through a stop valve 5, to a liquid supply pipe 6. A short interconnecting pipe 7 provides communication between the settling tube 3 and the measuring head 1, one end 8 of the pipe 7 projecting horizontally into the settling tube 3. This end 8 of the pipe 7 is provided with a dished strainer 9 mounted coaxially with the pipe 7 and such that the rim thereof effectively forms an enlarged opening at the end 8 of the pipe 7. A gauze screen 10 is provided across the opening of the strainer 9 and is secured to the rim of the latter.

A removable closure cap 12 is screwed on the upper end 2 of the settling tube 3 and the cap 12 incorporates a short vertical bleed pipe 13 which passes through the cap 12. The lower end of the bleed pipe 13 is fitted with a further strainer 14 of identical form to the strainer 9 and the upper part of the bleed pipe 13 which projects from the top surface of the closure cap 12 is provided with a bleed valve 15.

As shown in FIGURE 2, the head 1 comprises in combination, to form a single compact unit, a cyclone filter 17 and a conductivity cell 18. The conductivity cell 18 comprises a hollow cylindrical body 19 having a screw-threaded lower end section 20 of reduced diameter. The upper end of the bore of the body 19 is internally screw threaded at 21 to receive a closure plug 22. On the inner surface of the plug 22 is provided a threaded coaxial extension 23 on to which is screwed a metallic tube 24 which extends concentrically within the cell body 19. The tube 24 has vent apertures 25 adjacent its upper end above the cell liquid outlet level indicated by the line X—X, and the lower end is disposed above the point where, in use, liquid flows from the filter 17 to the cell 18.

The tube 24 forms an earthed measuring electrode of the cell 18 and a second mushroom-headed measuring electrode 27 is provided with a shank 28 passing through the wall 29 of the cell body 19. The second electrode 27 is located by an insulating bush 30 which fits into and locates against a radial cylindrical projection 31 of the cell body 19, the bush 30 being held in position by a collar 32 screwed on the projection 31. The second electrode 27 is adjustable within the insulating bush 30 so that the spacing between the two measuring electrodes can be adjusted to change the cell constant to suit the external electrical measuring circuit (not shown).

Towards the upper end of the body 19 of the cell 18 there is provided a radially extending outlet 33 for liquid in the cell 18.

The lower end 34 of the bore of the cell 18 is frusto-conical and tapers towards a central inlet port 35 of the cell 18 into which is fitted an inlet pipe 36 which, when the cell 18 and filter 17 are assembled together, extends into the filter where it acts as a "vortex finder."

The cyclone filter 17 has a cylindrical body 38 screwed on to the reduced diameter section 20 of the body 19 of the conductivity cell 18. Thus, the cell 18 surmounts the filter 17 and a compact single unit is provided. The other end of the interconnecting pipe 7 from said one end 8 passes through the body 38 of the filter 17 and forms an inlet 39 of the latter. The inlet 39 opens tangentially into the body 38 of the filter 17 above the lower end 40 of the inlet pipe 36 to the cell 18, and a waste product outlet 41 of the filter 17 is disposed at the lower end. The cylindrical bore of the filter 17 has a frustoconical bottom section 42 which tapers towards the outlet 41 to aid the flow of both liquid and solids from the filter 17.

In use, the stop valve 5 is opened and a mixture of a liquid and solids, such as sand and water for example, flows from the supply pipe 6, up the settling tube 3, through the strainer 9 and interconnecting pipe 7 to the inlet 39 of the filter. The coarser particles of sand are too dense to follow the liquid flow up the settling tube 3 and are trapped in the bottom thereof. The strainer 9 provides a further filtering action which prevents the coarser particles which do follow the liquid flow up the settling tube 3 from entering the cyclone filter 17. As the mixture enters the cyclone filter 17 tangentially, the solid particles are swept downwardly, being held against the walls of the bore of the filter by centrifugal force, whilst solids-free water passes upwards to the conductivity cell 18 through the inlet pipe 36. The water fills the cell 18 to the level X—X determined by the cell outlet 33, whereupon its conductivity can be measured in known manner utilising the two measuring electrodes 24 and 27.

If a continuous flow of water and sand to the settling tube 3 is provided, there is a continuous flow of clean water through the conductivity cell 18. As more water rises from the filter 17, the existing water in the cell 18 is displaced from the outlet 33 of the cell 18. Thus, the sample of water in the cell is continuously changing and any variation of conductance immediately measured. If the flow of sand and water to the filter 17 ceases the head empties immediately, the water in the cell 18 flowing downwardly and out through the filter outlet 41. Thus, the head is self-draining and there is little or no tendency for sediment to accumulate therein or stagnant liquid to be trapped.

In use the air bubbles tend to rise up the settling tube 3 and in order to release the air trapped at the top of the settling tube 3 the bleed valve 15 is opened thereby preventing any air locks developing in the system.

The settling tube 3 may be dispensed with in which case the filter 17 is supplied directly from the liquid supply pipe 6.

I claim:

1. A measuring head for a conductivity meter comprising in combination an electrical conductivity cell with measuring electrodes, and a cyclone filter which forms a single unit with the conductivity cell and with a hollow body having a vertically disposed longitudinal axis and defining an internal space of generally circular cross-section, the filter having a side inlet which enters into said space in a direction such that liquid flowing from the inlet into the body is directed to one side of said longitudinal axis to provide vortical circulation of liquid in the body about said axis, a lower drain outlet for the egress of solid matter filtered from the liquid and a passage interconnecting the filter and the cell with a passage inlet so positioned as to act as a vortex finder, filtered liquid thus passing from the filter to the cell through the passage prior to conductivity measurement in the cell.

2. A measuring head according to claim 1, wherein the inlet enters into the body of the filter tangentially.

3. A measuring head according to claim 1, wherein the conductivity cell surrounds the cyclone filter.

4. A measuring head according to claim 3, wherein the conductivity cell has a hollow body screwed into the top of the body of the cyclone filter.

5. A measuring head according to claim 4, wherein the body of the conductivity cell carries an interconnecting tube which projects downwardly into the body of the cyclone filter and which provides said passage.

6. A measuring head according to claim 4, wherein the body of the conductivity cell has a central tube forming one of said electrodes.

7. A measuring head according to claim 4, wherein another of said electrodes is adjustably mounted in a side wall of the body of the cell so that the spacing between the electrodes is adjustable.

8. A measuring head according to claim 1, wherein the body is of cylindrical shape internally.

9. A measuring head according to claim 1, and in combination with a vertically disposed settling tube, the head being mounted on the tube and said inlet communicating with the settling tube up which in use liquid passes.

10. A measuring head according to claim 9, wherein said inlet communicates with the settling tube through a strainer.

References Cited

UNITED STATES PATENTS

| | | | |
|---|---|---|---|
| 1,474,594 | 11/1923 | Keeler | 324—30 X |
| 1,734,342 | 11/1929 | Perry | 324—30 |
| 2,146,312 | 2/1939 | Powell et al. | 324—30 |
| 2,541,578 | 2/1951 | Egalon et al. | 324—30 |
| 2,687,185 | 8/1954 | McChesney | 324—30 X |
| 2,766,442 | 10/1956 | Meyer. | |
| 3,014,178 | 12/1961 | Dunn | 324—30 |

RUDOLPH V. ROLINEC, Primary Examiner

C. F. ROBERTS, Assistant Examiner

U.S. Cl. X.R.

137—5